Patented Aug. 16, 1932

1,871,939

UNITED STATES PATENT OFFICE

ELMER W. ADAMS, OF WHITING, INDIANA, ASSIGNOR TO STANDARD OIL COMPANY, OF WHITING, INDIANA, A CORPORATION OF INDIANA

DRAWING LUBRICANTS

No Drawing.　　Application filed July 25, 1927. Serial No. 208,426.

This invention relates to drawing lubricants and particularly to drawing lubricants containing animal fats and colloidal earths or clays.

The composition of the present invention is preferably prepared in the form of a concentrated emulsion which is capable of dilution to a considerable degree to provide a dilute emulsion suitable for use in drawing and die-pressing.

The drawing compound, according to the invention, comprises animal fat, colloidal clay, mineral oil, and an emulsifying agent, preferably emulsified with a small amount of water.

The animal fat may be tallow, lard, or other animal fats, or fatty oils, and may constitute a substantial proportion of the concentrated emulsion. For example, it may vary between 1 to 30% of said emulsion. The quantity of animal fat is, however, preferably from 15 to 30% since this substance is greatly desired in such compositions and great difficulty has heretofore been experienced in producing drawing compounds containing sufficient amounts of such fats and retaining them in suspension in dilute emulsions and at high temperatures. In practice, it is preferred to employ tallow as the animal fat.

The mineral oil is preferably a distillate lubricant oil of relatively low viscosity. Straw oil is suitable.

As the colloidal clay, wilkinite, bentonite, or other colloidal clays, may be used. These clays materially assist in the production of a satisfactory drawing lubricant containing large percentages of animal fat.

As an emulsifying agent, it is preferable to employ mahogany soaps, that is, the preferentially oil soluble sulphonates of the alkali metal produced by adding a small quantity of alkali to sulfuric acid treated petroleum oil after withdrawal of the sludge formed during such treatment, and extracting the sulfonates from the oil with dilute alcohol or acetone, or in other suitable manner. Other emulsifying agents such as are ordinarily employed as the emulsifient in mineral oils and fats, may be employed, if desired. For example, naphthenic soaps, derived from mineral oil may be employed. The naphthenic soaps may be produced by treating lubricant distillate from coastal crudes or other crudes containing naphthenic acids, with alkali and extracting with alcohol, or in any other suitable manner.

The compound may suitably comprise a small proportion of a preservative, such as pine oil, or the like.

The concentrated emulsion may suitably be constituted by animal fat 1 to 30%, colloidal clay 1 to 50%, an emulsifying agent 2 to 20%, mineral oil 2 to 20%, pine oil 0.1% to 2%, and water 1 to 75%.

The ingredients are mixed together and emulsified in any suitable manner, for example, by passing through a colloid mill or a centrifugal pump.

As a specific example, the following composition is given:

| | Per cent |
|---|---|
| Tallow | 15 |
| Wilkinite | 20 |
| Mahogany soap | 10 |
| Straw oil | 10 |
| Pine oil | 1 |
| Water | 44 |

Although the present invention has been described in connection with the details of a specific example, it is not intended that such details shall be regarded as limitations upon the scope of the invention, except in so far as included in the accompanying claims.

I claim:

1. An emulsified composition suitable for drawing lubricants comprising oil alkali metal soap of, preferentially oil soluble sulphonates derived from mineral oil, colloidal clay, and water.

2. A composition adapted to be diluted to yield relatively stable emulsions suitable for drawing lubricants comprising fatty body, mineral oil, colloidal clay, and soap derived from mineral oil.

3. A composition adapted to be diluted to yield relatively stable emulsions suitable for drawing lubricants comprising tallow, mineral oil, colloidal clay, and soap derived from mineral oil.

4. A composition adapted to be diluted to yield relatively stable emulsions suitable for drawing lubricants comprising tallow, mineral oil, colloidal clay, and an alkali metal soap derived from mineral oil.

5. A composition adapted to be diluted to yield relatively stable emulsions suitable for drawing lubricants comprising animal fat, mineral oil, colloidal clay, and an alkali metal soap derived from mineral oil.

6. A composition adapted to be diluted to yield relatively stable emulsions suitable for drawing lubricants comprising tallow, mineral oil, colloidal clay, sulphonate soaps derived from mineral oil, pine oil, and water.

7. An emulsified composition adapted to be diluted to yield relatively stable emulsions suitable for drawing lubricants comprising tallow, straw oil, wilkinite, mahogany soap, pine oil, and water.

8. An emulsified composition adapted to be diluted to yield relatively stable emulsions suitable for drawing lubricants comprising animal fat 1 to 30%, mineral oil 2 to 20%, colloidal clay 1 to 50%, soap derived from mineral oil 2 to 20%, pine oil 0.1 to 2%, and water 1 to 75%.

9. An emulsified composition adapted to be diluted to yield relatively stable emulsions suitable for drawing lubricants comprising tallow 15%, mineral oil 10%, wilkinite 20%, mahogany soap 10%, pine oil 1%, and water 44%.

10. An emulsified composition suitable for drawing lubricants comprising oil, soap derived from mineral oil, colloidal clay, and water.

11. A composition adapted to be diluted to yield relatively stable emulsions suitable for drawing lubricants comprising fatty body, mineral oil, colloidal clay, pine oil, an alkali metal soap derived from mineral oil, and water.

12. An emulsifying composition adapted to be diluted to yield relatively stable emulsions suitable for drawing lubricants comprising fatty body 1 to 30%, mineral oil 2 to 20%, colloidal clay 1 to 50%, an alkali metal soap derived from mineral oil 2 to 20%, and water 1 to 75%.

13. An emulsifying composition adapted to be diluted to yield relatively stable emulsions suitable for drawing lubricants comprising fatty body 1 to 30%, mineral oil 2 to 20%, colloidal clay 1 to 50%, an alkali metal soap derived from mineral oil 2 to 20%, pine oil 0.1 to 2%, and water 1 to 75%.

14. A composition adapted to be diluted to yield relatively stable emulsions suitable for drawing lubricants comprising fatty body, mineral oil, colloidal clay, sulfonate soaps derived from mineral oil, and water.

15. A composition adapted to be diluted to yield relatively stable emulsions suitable for drawing lubricants comprising fatty body, mineral oil, colloidal clay, preferentially oil soluble sulfonate soaps derived from mineral oil, and water.

ELMER W. ADAMS.